United States Patent [19]
Butler

[11] 4,455,010
[45] Jun. 19, 1984

[54] RESILIENT SUPPORT

[76] Inventor: Robert Butler, 6414 University Ave., San Diego, Calif. 92115

[21] Appl. No.: 285,296

[22] Filed: Jul. 21, 1981

[51] Int. Cl.³ .............................................. F16M 13/00
[52] U.S. Cl. ..................................... 248/576; 248/600; 248/602
[58] Field of Search ...................... 248/162.1, 575, 576, 248/599, 600, 602, 356; 211/105.6

[56] References Cited

U.S. PATENT DOCUMENTS

| | | | |
|---|---|---|---|
| 603,735 | 5/1898 | Porter | 248/600 X |
| 1,036,813 | 8/1912 | Edsall et al. | 211/105.6 X |
| 1,868,439 | 7/1932 | Zielinski | 211/105.6 |
| 1,876,812 | 9/1932 | Wiley et al. | 248/575 |
| 2,681,686 | 6/1954 | Sheron | 248/602 X |
| 3,128,071 | 4/1964 | Frazer-Nash | 248/602 X |
| 4,324,382 | 4/1982 | Beukema et al. | 248/406 |
| 4,379,540 | 4/1983 | French | 248/406 |

Primary Examiner—William H. Schultz
Attorney, Agent, or Firm—Frank D. Gilliam

[57] ABSTRACT

A resilient support for seats comprising telescoping members with a plurality of resilient members positioned therein in a series relationship with the telescoping members' relative movement; a plurality of resilient members stacked in a series relationship between the telescoping members, the resilient members each having an equal or different shore durometer hardness; an adjustment member for preloading said resilient members; and a lubricious bushing positioned between the contacting surfaces of the telescoping members.

11 Claims, 3 Drawing Figures

U.S. Patent      Jun. 19, 1984      4,455,010
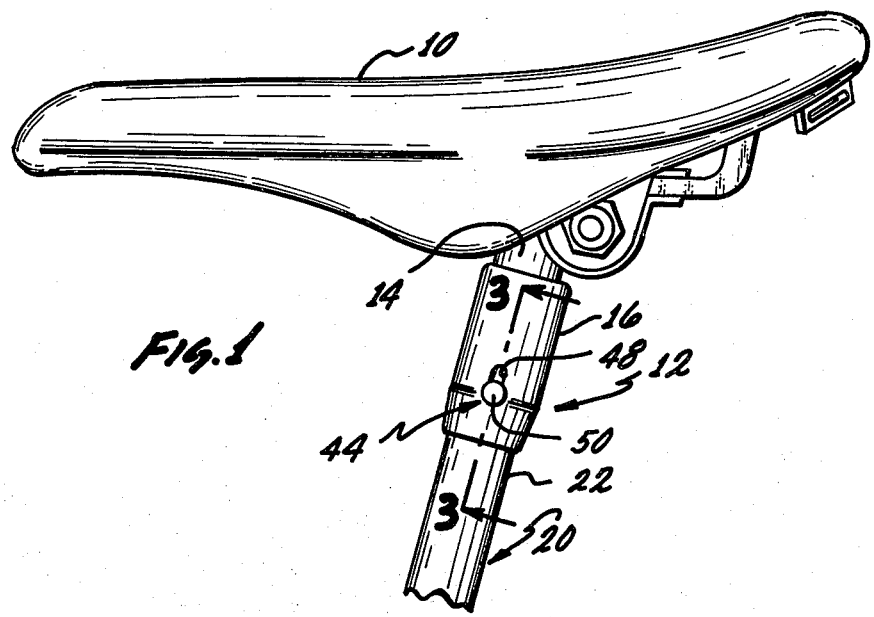
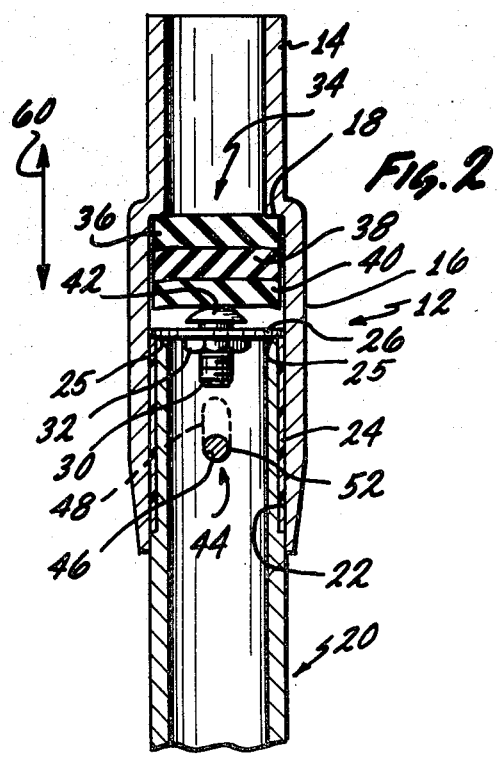
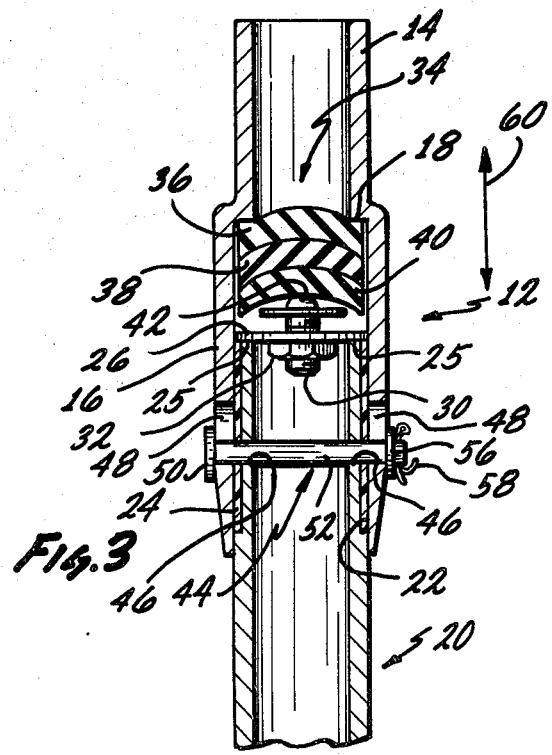

4,455,010

RESILIENT SUPPORT

BACKGROUND OF THE INVENTION

Various attempts have been made throughout time to provide comfort to the passengers of various vehicles traveling over rough terrain or the like. The greatest attention, it would appear, has been directed to surface support suspension system, such as for example, between the unsprung and sprung portions of a vehicle. This invention is directed to seat support suspension, particularly for seat support for vehicles which have little or no dampening or spring support between the support surface and the passenger, such as but not limited to so-called racing type bicycles. Typical examples of prior art patents directed to this problem include U.S. Pat. Nos. 575,815; 597,674; 2,188,153; and Re 24,911.

There has not been an entirely successful seat suspension system until the emergence of the instant invention.

SUMMARY OF THE INVENTION

An object of this invention is to improve rider comfort while riding a vehicle over uneven terrain.

Another object of this invention is to provide a vehicle suspension system which can be easily adapted to existing vehicles.

Another object of the invention is to provide suspension dampening the degree of which may be selected and/or adjusted through a range of degrees of shore durometer hardness.

Still another object of the invention is to adjust the dampening of the device to accommodate rider weight variations.

Still another object of the invention is to provide variable ride comfort depending on rider preferences.

Briefly stated, the above objectives are accomplished by placing a telescoping member between the rider and the vehicle support system. The movement of the telescoping member is controlled by a plurality of separate resilient members positioned in series between the relatively movable portions of the telescoping member. These resilient members can be preloaded by means of an adjustable surface on one of the movable portions of the telescoping member adjacent one of the series resilient members. The shore durometer hardness of the resilient members may be the same or different depending on the choice of rider weight and ride quality firmness. The movable portions of the telescoping member and the resilient members are held in relative positions by means of a pin operating in an elongated slot in at least one of the movable members and a bore in the other movable member. The movable portion of the telescoping member travels within the outer edges of the slot under normal operating conditions.

Other objects and purposes of the invention will be apparent to persons familiar with various vehicle suspensions.

BRIEF DESCRIPTION OF THE DRAWINGS

FIG. 1 is a side view of a bicycle seat supported on the force dampening device of the invention;

FIG. 2 is an enlarged cutaway section of FIG. 1 taken along line 2—2 in a relaxed mode; and FIG. 3 is a showing of FIG. 1 taken along line 3—3 in a stressed or weight bearing mode.

DETAILED DESCRIPTION

It should be understood that this shock support device can be utilized on any device where controlled dampening of vertical movement is desired. The following description is directed to use for supporting a bicycle seat for ease of explanation and not by way of limitation.

Referring now to the drawing figures wherein like numerals correspond to like elements or parts throughout the drawings and specifications:

A seat 10 is attached in a conventional manner to one end of a support member 12. The support member has an upper portion 14 and a lower portion 16. The lower portion 16 of support member 12 has a greater cross-sectional dimension than upper portion 14. At least the lower portion 16 of support member 12 is tubular in cross-section. A shoulder 18 is formed within the tubular portion 16 between portions 14 and 16.

A second support member 20 is attached at its lower end to vehicle support structure (not shown), with its upper end 22 sized to telescope within tubular portion 16. The telescoping end of second support member 20 that engages the inner surface 22 of tubular portion 16 of support member 12 has a reduced diameter to accommodate a bushing or sleeve member 24. The bushing 24 is constructed of lubricious material, such as but not limited to, plastics, such as, Teflon, Delrin, or the like, bronze impregnated with lubricant or the like and any other bearing material suitable for the purpose intended. It should be understood that the bushing thickness still allows freedom of movement of the second support member 20 within tubular portion 16 when the bushing is in place.

Positioned on the upper open end surface 25 of the second support member 20 is a disk or washer 26 which spans the open end surface 25. Centrally positioned on disk 26 is a longitudinally threaded aperture (not shown). A threaded screw 30 with either a rounded or flat head engages the threads of aperture 28. An additional threaded member, for example, a nut 32 shown attached to the inner surface of disk 26, may be included to give added strength to the screw/disk threaded attachment. The head 42 of screw 30 may also take the form of a flat plate member with a central protrusion (see FIG. 3).

Positioned between shoulder 18 and the disk 26/screw 30 combination is a resilient member 34 comprising three separate resilient shims 36, 38, 40. It should be understood that although three shims are shown more than three or less than three may be utilized to practice the intent of this invention. The number of resilient shims and their thickness within practical size limitation for the purpose intended are the only controlling factors as to number employed to practice the invention. For example, where the desired total thickness is limited to approximately one inch, as in the bicycle support as shown, three are utilized with each being substantially equal in thickness and that thickness is approximately one-third of an inch. Six disks having approximately one-sixth of an inch could be used as could two disks of approximately one-half inch each. Thickness and shape of the various disks could likewise be different providing they fit within support members 12 and the total number equal a desired relaxed thickness.

As can be seen in FIGS. 2 and 3, the head 42 of the screw 30 rides against shim 40 and according to the position of head 42 relative to disk 26 applies a range of preloading on the resilient disks, hereinafter discussed in more detail.

The support member 12 and 20 are telescopically attached by means of a pin 44 passing through a bore 46 and a longitudinal slot 48. One member has the slot and the other has the bore, which is merely a matter of choice. As shown the slot 48 is located in portion 16 of support member 12 and the bore is positioned through second support member 20. It should be understood that bushing 24 has a bore or slot conforming to the bore or slot configuration of second support member 20. A pin 44 holds the telescoping members in position. The pin 44 has a head 50 and a shaft 52 with a bore 54 on its outer distal end. When the pin 44 is inserted through the slot and bore the head 50 being greater in cross-section than the bore or slot prevents the pin from passing through. A washer 56 is placed on the free end of shaft 52 on the opposite side of the head 50 and then keeper 58 passing through bore 54 keeps the pin in position.

As should be understood, the maximum length of telescoping travel between the support members 12, 20 is determined by the length of slot 48.

The following data was taken during actual testing of the invention utilizing resilient disks 36, 38 40 of shore durometer hardness in the range of 10 to 50.

It was found that with three approximately $\frac{1}{4}$" disks that when disk 36 had a shore durometer hardness (SDH) of 50, disk 38 had a SDH of 30 and disk 40 had a SDH of 10 seat support member 12 travels about 1/16" along arrow 60 (see FIG. 3) when 8 pounds was added to the seat 10; when travel was approximately $\frac{1}{8}$" when 15 pounds was added to seat 10; travel was approximately 3/16" when 25 pounds was added to the seat; and approximately $\frac{1}{4}$" when 40 pounds was added to seat 10.

It was found that with three approximately $\frac{1}{4}$" disks that when disk 36 had a SDH of 50, disk 38 had a SDH of 30 and disk 40 had a SDH of 30 seat support member 12 traveled about 1/16" along arrow 60 when 10 pounds was added to seat 10; travel was about $\frac{1}{8}$" when 20 pounds of weight was added to the seat 10; travel was about 3/16" when 35 pounds was added to the seat 10; and travel was about $\frac{1}{4}$" when 52 pounds was added to the seat.

It was found that with three approximately $\frac{1}{4}$" disks that when disk 36 had a SDH of 50, disk 38 had a SDH of 50, and disk 40 had a SDH of 30 seat support member 12 traveled about 1/16" along arrow 60 when 13 pounds was added to seat 10; travel was about $\frac{1}{8}$" when 26 pounds was added to the seat; travel was about 3/16" when 40 pounds was added; and travel was about $\frac{1}{4}$" when 65 pounds was added.

It should be understood that mixed SDH resilient members provide non-linear resilience, i.e. a progressional dampening rate.

The above examples indicate the various SDH of the resilient material required to be utilized as passenger weight is added to the seat over and above a predetermined weight value to prevent bottoming out of the pin 44 on either end of slot 48 and thereby limit the movement of the telescoping members to within no more than 99% of the slot length, i.e., just short of contact between slot end walls and pin.

An additional limited adjustment is provided in ride comfort and length of translation by adjustment of screw 30 in aperture 28 of the disk 26. Preloading of the combined SDH of the disks is at a maximum with the screw fully extended and minimum when fully retracted. Various different adjustment lengths of screw 30 will necessarily provide various combined SDH within the maximum/minimum range. Effectively the adjustment of screw 30 provides a fine adjustment to the fixed SDH of the disks.

It should be understood that the disks could have equal or different SDH values through a range of from about 5–80 SDH depending on the purpose, roughness of terrain, weight of rider, etc.

Thus having described the invention, what is claimed as novel and desired to be secured by Letters Patent of the United States of America is:

1. A resilient support for seats or the like comprising:
    a first tubular member having an upper seat attachment portion and a lower portion,
    a second member attached to seat supporting structure at one end and configured to telescope within said lower portion at its other end,
    a plurality of resilient members positioned associated with, said first and second members;
    a protruding member carried by one of said members and positioned to engage only the center of one of said resilient members; and
    a pin for passing through said elongated slot and said bore when said first and second members are engaged for securing together said members in a telescoping relationship,
    whereby relative downward forces between said members cause said members to telescope wherein said protruding member bears against said center portion of said one of said resilient members forcing the center portion of all of said resilient members to resistively yield to said downward forces.

2. The invention as defined in claim 1 wherein said first and second member are tubular in cross-section.

3. The invention as defined in claim 1 wherein a bushing is positioned between said first and second members engaging surface.

4. The invention as defined in claim 3 wherein said bushing is constructed of lubricious material.

5. The invention as defined in claim 3 or 4 wherein said bushing is constructed of self lubricating plastic material.

6. The invention as defined in claim 1 wherein said protruding member is vertically length adjustable relative to said members wherein the central portion of all of said resilient members are forced to resistively yield at a selected degree prior to the application of said downward forces and to further resistively yield when said downward forces are applied.

7. The invention as defined in claim 1 wherein said plurality of resilient means comprises three resilient members.

8. The invention as defined in claim 7 wherein each of said three resilient members has a different shore durometer hardness.

9. The invention as defined in claim 8 wherein the shore durometer hardness of said three resilient members ranges from 5 to 80.

10. The invention as defined in claim 8 wherein the shore durometer hardness of said three resilient members ranges from 10 to 30.

11. The invention as defined in claim 8 wherein one of said plurality of resilient members has a shore durometer hardness of 10, another 30, and the other 50.

* * * * *